United States Patent [19]
Aoki et al.

[11] Patent Number: 5,792,948
[45] Date of Patent: Aug. 11, 1998

[54] ACTIVE VIBRATION CONTROL APPARATUS FOR VEHICLE

[75] Inventors: Kazushige Aoki; Tutomu Hamabe; Shigeki Satoh, all of Kanagawa; Yousuke Akatu, Yokohama, all of Japan

[73] Assignee: Nissan Motor Co., Ltd., Yokohama, Japan

[21] Appl. No.: 826,394

[22] Filed: Apr. 9, 1997

[30] Foreign Application Priority Data

Apr. 10, 1996 [JP] Japan ................................ 8-088596

[51] Int. Cl.$^6$ .................................................. G01L 3/26
[52] U.S. Cl. ............................ 73/116; 73/570; 364/574
[58] Field of Search ........................... 73/116, 119 R, 73/593, 570; 381/71.2, 71, 71.14; 180/300; 364/574

[56] References Cited

U.S. PATENT DOCUMENTS

| | | | |
|---|---|---|---|
| 5,042,321 | 8/1991 | Hongo et al. | 74/606 R |
| 5,219,037 | 6/1993 | Smith et al. | 180/312 |
| 5,275,388 | 1/1994 | Kobayashi et al. | 267/140.14 |
| 5,360,080 | 11/1994 | Yamazaki et al. | 180/300 |
| 5,386,372 | 1/1995 | Kobayashi et al. | 364/574 |
| 5,423,523 | 6/1995 | Gossman et al. | 267/140.15 |
| 5,544,080 | 8/1996 | Kobayashi et al. | 364/574 |
| 5,617,315 | 4/1997 | Nakao et al. | 364/424.045 |
| 5,629,986 | 5/1997 | Shoureshi et al. | 381/71 |
| 5,649,018 | 7/1997 | Gifford et al. | 381/71.14 |
| 5,651,072 | 7/1997 | Nakao et al. | 381/71.2 |

FOREIGN PATENT DOCUMENTS

| | | |
|---|---|---|
| 64-3530 | 1/1989 | Japan . |
| 64-3531 | 1/1989 | Japan . |
| 64-35329 | 2/1989 | Japan . |
| 4-302729 | 10/1992 | Japan . |

*Primary Examiner*—Elizabeth L. Dougherty
*Attorney, Agent, or Firm*—Foley & Lardner

[57] ABSTRACT

A vibration control apparatus for a vehicle equipped with a power unit and a vehicle body is comprised of an active engine mount disposed between the power unit and the vehicle body. A controller is connected to a vehicle body vibration detector, a passenger compartment vibration detector and a drive force detector. The vehicle body vibration detector detects a vibration transmitted from the power unit to the vehicle body through the active engine mount. The passenger compartment vibration detector detects a vibration of a member defining a passenger compartment of the vehicle. The drive force detector detects as to whether driving force of the power unit is transmitted to driving wheels. The controller controls the active engine mount to reduce the passenger compartment vibration when the driving force is transmitted to the driving wheels and to reduce the vehicle body vibration when the driving force is not transmitted to the driving wheels.

21 Claims, 10 Drawing Sheets

ACTIVE VIBRATION CONTROL
APPARATUS FOR VEHICLE

BACKGROUND OF THE INVENTION

1. Field of the Invention

The present invention relates to an active vibration control apparatus which reduces the vibration transmitted from a power unit to a vehicle body by actively generating a supporting force thereby, and more particularly, which is arranged such that an effective vibration reducing control is executed through an active engine mount installed between the power unit and the vehicle body.

2. Description of the Prior Art

Generally, an engine mount functions as a vibration insulating device in use for supporting a power unit of a vehicle and is mainly required to perform a vibration insulating function with respect to vibrations caused by idling, engine-shake, booming and noises during a vehicle acceleration. However, in order to reduce such idling vibrations, which has a relatively large magnitude ranging from about 20 to 30 Hz, the vibration insulating device is required to have characteristics of a high dynamic spring constant and a high damping coefficient. In contrast, in order to reduce the booming vibration and/or the acceleration vibration which has a relatively small magnitude ranging from about 80 to 800 Hz and the engine-shake which has a relatively large magnitude ranging from 5 to 15 Hz, the vibration insulating device is required to have characteristics of a low dynamic spring constant and the low damping coefficient. Accordingly, it is difficult to insulate all vibrations by a normal elastic engine mount or by an engine mount of a conventional fluid sealed type.

Japanese Patent Provisional Publication No. 4-302729 discloses an active engine mount of a fluid sealed type which engine mount is able to generate an active supporting force. This active engine mount is controlled to suppress the relatively low frequency vibration such as engine shake transmitted from the vibration source to the supporting member by utilizing the resonance of the fluid moving between two fluid chambers and to cancel the relatively high frequency vibration higher than the idle vibration by actively generating the supporting force. The supporting force is generated by actively displacing the movable plate defining the fluid chamber so that the pressure change in the fluid chamber is applied to the expansion spring of the supporting elastomer. By this control, this conventional active engine mount cancels the vibration transmitted from the power unit to the vehicle body through the active engine mount by the active supporting force generated by the active engine mount so as to reduce the vibration of the vehicle body.

However, the vibration generated by the driving force of the engine is practically transmitted through a route not including the engine mount such as "engine→drive shaft→driving wheel→suspension→vehicle body". Therefore, it is difficult to further improve the vibration reduction of the passenger compartment by this conventional active engine mount. Particularly, in case that the idle vibration of 20 to 30 Hz and large magnitude is generated and the shift position of the automatic transmission is put in the drive position so as to establish the vibration transmission route not including the engine mount, it is difficult to sufficiently derease the vibration in the passenger compartment.

SUMMARY OF THE INVENTION

It is an object of the present invention to provide a vibration insulating device which can generate a supporting force for reducing a large vibration of a large magnitude without using a large actuator.

A first aspect of the present invention resides in a method of controlling an active engine mount installed between a power unit and a vehicle body of a vehicle. The methods comprising the steps of detecting as to whether a bending vibration mode of a vehicle body frame tends to be excited; controlling the active engine mount according to a vibration of a member surrounding a passenger compartment of the vehicle when the bending vibration mode of a vehicle body frame tends to be excited; and controlling the active engine mount according to the vibration transmitted from the power unit to the vehicle body through the active engine mount when the bending vibration mode of the vehicle body frame does not tend to be excited.

A second aspect of the present invention resides in an apparatus for controlling an active engine mount installed between a power unit and a vehicle body of a vehicle. The apparatus comprises a detector for detecting as to whether a bending vibration mode of a vehicle body frame tends to be excited, a controller for controlling the active engine mount according to a vibration of a member defining a passenger compartment of the vehicle when the bending vibration mode of a vehicle body frame tends to be excited and a controller for controlling the active engine mount according to a vibration transmitted from the power unit to the vehicle body through the active engine mount when the bending vibration mode of the vehicle body frame does not tends to be excited.

A third aspect of the present invention resides in a vibration control apparatus for a vehicle equipped with a power unit and a vehicle body. The vibration control apparatus comprises an active engine mount disposed between the power unit and the vehicle body. A vehicle body vibration detector detects a vibration transmitted from the power unit to the vehicle body through the active engine mount. A passenger compartment vibration detector detects a vibration of a member defining a passenger compartment of the vehicle. A drive force detector detects as to whether driving force of the power unit is transmitted to driving wheels. A controller controls the active engine mount so as to reduce the vibration detected by the passenger compartment vibration detector when the drive force detector detects that the driving force is transmitted to the driving wheels. The controller controls the active engine mount so as to reduce the vibration detected by the vehicle body vibration detector when the drive force detector detects that the driving force is not transmitted to the driving wheels.

BRIEF DESCRIPTION OF THE DRAWINGS

In the drawings, like reference numerals designate like parts and elements throughout all figures, in which.

DETAILED DESCRIPTION OF THE INVENTION

Figure 1:
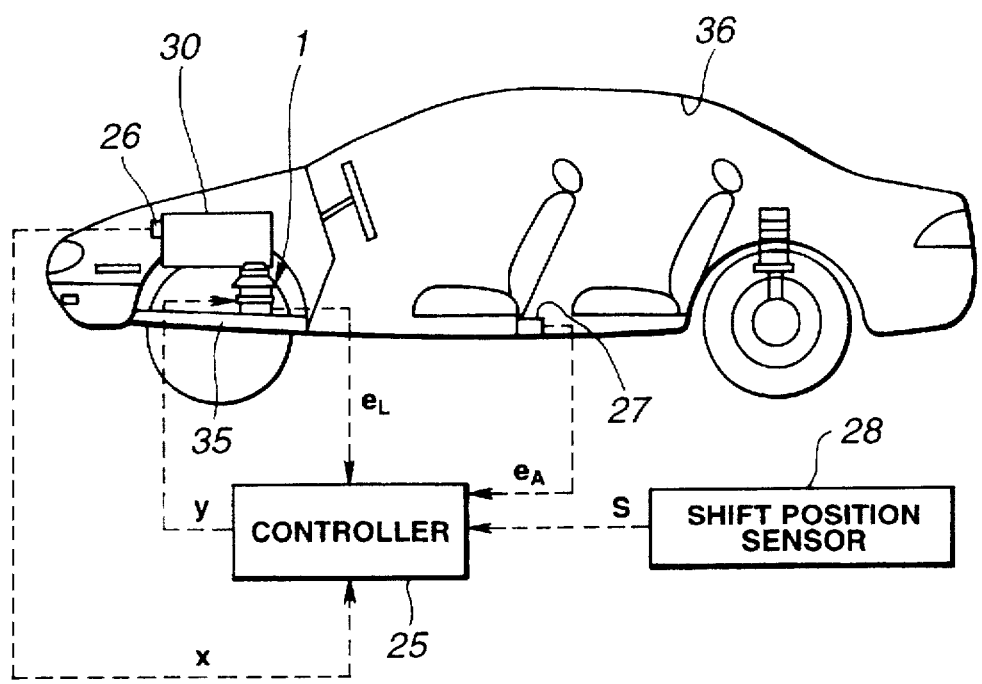
FIG. 1 is a schematic side view which shows a first embodiment of a vibration control apparatus according to the present invention.
Figure 2:
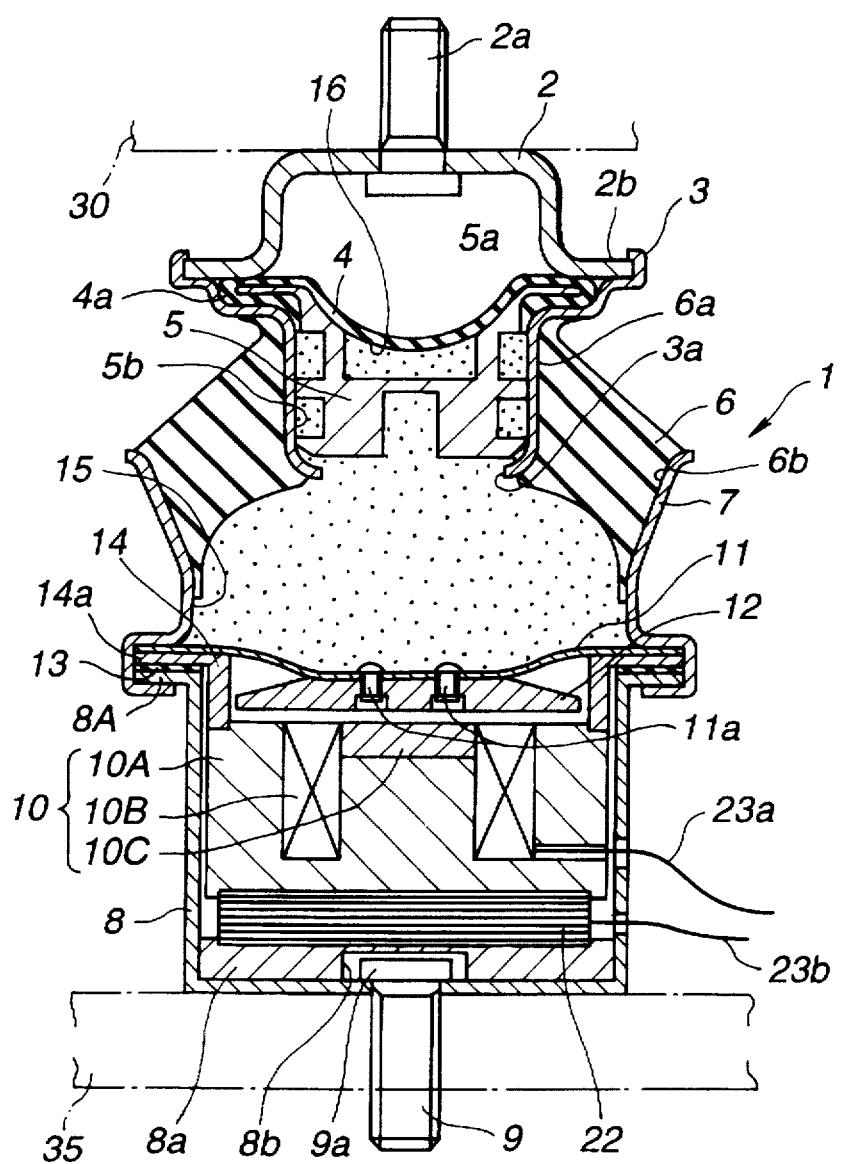
FIG. 2 is a cross-sectional view of an active engine mount which is applied to the first embodiment of FIG. 1.
Figure 3:
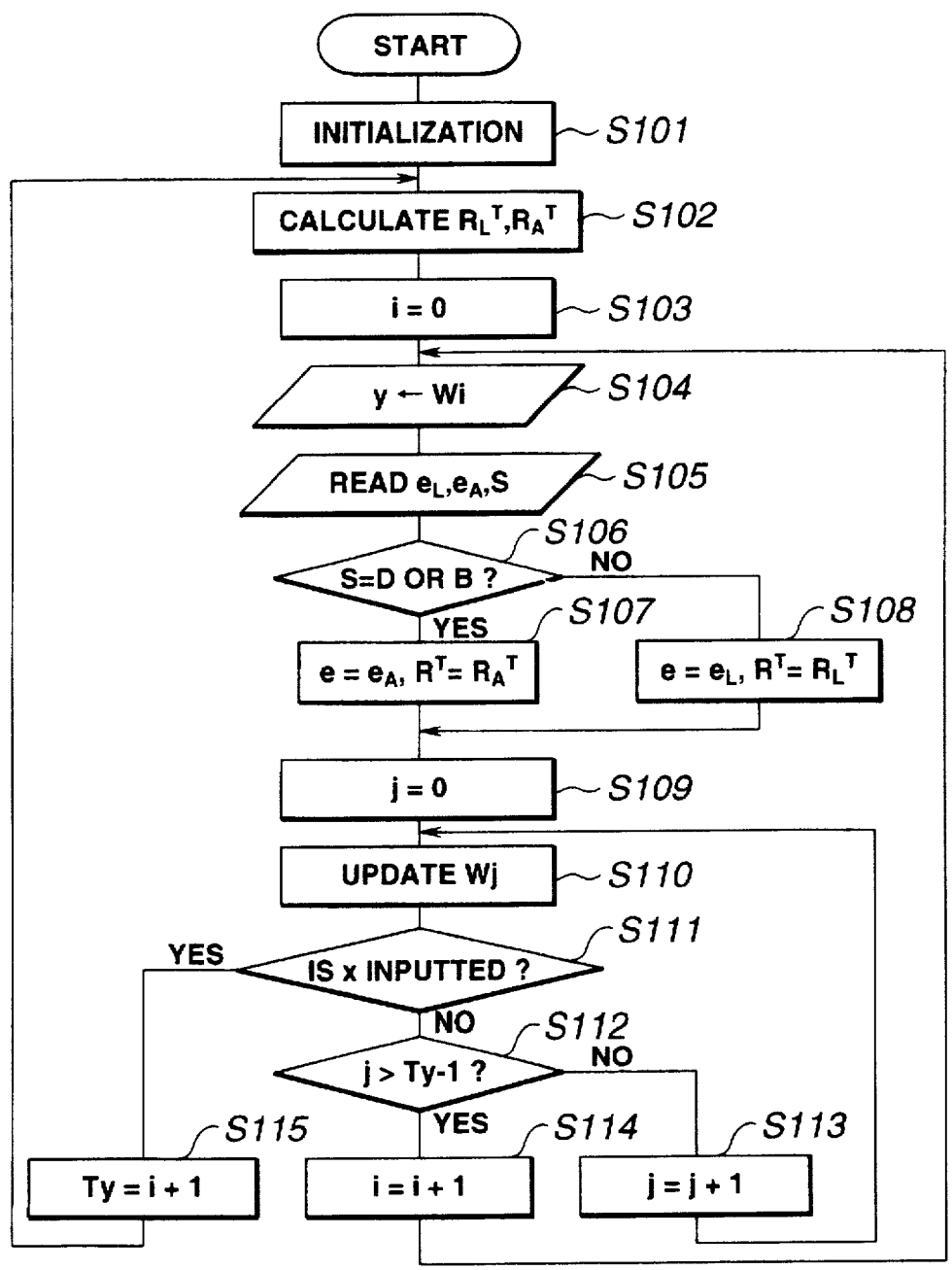
FIG. 3 is a flowchart which shows processing executed in the controller of the first embodiment.

Referring to FIGS. 1 to 3, there is shown a first embodiment of a vibration control apparatus according to the present invention.

A power unit 30 including an engine is supported to a vehicle body 35 including a suspension member through an active type engine mount 1. The active engine mount 1 is arranged to generate an active supporting power according to a drive signal. Further, a plurality of passive engine mounts, which passively generate supporting forces respectively according to the relative displacement between the power unit 30 and the vehicle body 35, are disposed between the power unit 30 and the vehicle body 35, in addition to the active engine mount 1. Such passive engine mounts may be a normal engine mount made from rubber type elastic member or a fluid-sealed type insulator which is formed by sealingly filling fluid in a rubber body.

The active engine mount 1 of this first embodiment is constructed as shown in FIG. 2. The active engine mount 1 comprises an installation bolt 2a through which the active engine mount 1 is connected with the power unit 30. Integrally connected with the installation bolt 2a is an installation cup 2 formed into a cup-shape. The installation cup 2 forms a hollow by its inner surface and has an open round peripheral 2b. The open round peripheral 2b of the installation cup 2 is caulked with an upper end portion of an inner cylinder 3.

The lower end portion of the inner cylinder 3 is bent inwardly. An opening portion 3a is formed at the inwardly-bent lower end portion. A diaphragm 4 is disposed inside of the inner cylinder 3 so as to divide an inner space defined by the installation cup 2 and the inner cylinder 3 into upper and lower parts. An outer periphery 4a of the diaphragm 4 clamped by the installation cup 2 and the inner cylinder 3 by means of a caulking therebetween. The divided upper part is communicated with atmosphere through a hole formed at the installation cup 2.

An orifice construction member 5 is disposed in the inner cylinder 3 and under the diaphragm 4. An elastic film such as an extended outer peripheral portion of the diaphragm 4 is disposed between the inner cylinder 3 and the orifice construction member 5 for the fix installation of the orifice construction member 5. The orifice construction member 5 is formed into a generally cylindrical shape to fit with the inner surface of the inner cylinder 3. A circular depression 5a is formed at an upper surface of the orifice construction member 5. A part of a bottom surface opposite to the opening portion 5a and the circular depression 5a are communicated by means of an orifice 5b. The orifice 5b of this embodiment is constructed by a groove spirally extending around the outer periphery of the orifice construction member 5, a passage communicating an end of the spiral groove with the depression 5a, and a passage communicating the other end of the spiral groove with the opening portion 3a.

An inner surface 6a of a cylindrical supporting elastomer 6 is valcanizedly connected with an outer surface of the inner cylinder 3. An outer surface 6b of the supporting elastomer 6 is valcanizedly connected with an inner surface of an outer cylinder 7 upwardly expanded in diameter.

A lower end portion of the outer cylinder 7 is caulked with a flange portion 8A of an actuator case 8. The actuator case 8 is formed into a cup-shape which is cylindrical and upwardly opened. An installation bolt 9 for installing the engine mount 1 to the vehicle body 35 is projected from a lower end surface of the actuator case 8. A head portion 9a of the installation bolt 9 is received in a hollow portion 8b of the plate member 8a and connected to a bottom surface of the actuator case 8.

Furthermore, an electromagnetic actuator 10 is fittingly disposed in the actuator case 8. The electromagnetic actuator 10 is constituted by a cylindrical iron yoke 10A, an exciting coil 10B which is of a circular coil wound round the vertical axis in the yoke 10A, and a permanent magnet 10C which is fixed to an upper surface of a part surrounded by the exciting coil 10B so as to form a polarity in the vertical direction.

A plate spring 11 made of a metal disc is disposed above the electromagnetic actuator 10 so as to cover an opening portion side of the actuator case 8. An outer peripheral portion 11a of the plate spring 11 is integrally clamped between the flange portion 8A of the actuator case 8 and the lower end portion of the outer cylinder 7. A disc-shaped magnetic path member 12 functioning as a movable plate is made of a magnetizable material such as iron and is fixed to a center portion of a lower surface of the plate spring 11 by means of rivets 11a so as to form a predetermined clearance relative to the upper surface of the electromagnetic actuator 10. Further, a ring-shaped elastic film 13 and a flange portion 14a of a power transmitting member 14 are caulked between the flange portion 8A and the plate spring 11. More particularly, the elastic film 13, the flange portion 14a of the power transmission member 14 and the plate spring 11 are stacked on the flange portion 8A of the actuator case 8 in the order of mention, and the stacked all are caulked with the lower end portion of the outer cylinder 7.

The power transmission member 14 is a short cylindrical member to surround the magnetic path member 12 and has the flange portion 14a connected to the upper end of the cylinder. The lower end portion of the power transmission member 14 is connected to the upper surface of the yoke 10A of the electromagnetic actuator 10. More particularly, the lower end portion of the power transmitting member 14 is engaged with a circular groove formed on an outer periphery of the upper surface of the yoke 10A. A spring constant of the power transmitting member 14 during the elastic deformation is set to be greater than the spring constant of the elastic film 13.

Furthermore, a main fluid chamber 15 is defined by the lower surface of the supporting elastomer 6 and the upper surface of the plate spring 11. An auxiliary fluid chamber 16 is defined by the diaphragm 4 and the depression 5a. The orifice 5b formed by the orifice construction member 5 communicates the main fluid chamber 15 and the auxiliary fluid chamber 16. The main fluid chamber 15, the auxiliary chamber 16 and the orifice 15a are filled with fluid such as oil.

The characteristics of the fluid sealed mount, which are determined by the shape of the passage of the orifice 5b are adjusted to perform a high dynamic spring constant and a high damping force when the engine-shake is generated during a vehicle traveling, that is, when the active engine mount 1 is vibrated within a range of 5 to 15 Hz.

The exciting coil 10B of the electromagnetic actuator 10 is electrically connected with a controller 25 functioning as an electromagnetic actuator controlling means through a harness 23a. The exciting coil 10B generates a predetermined electromagnetic force according to a drive signal y which is a drive current supplied from the controller 25. The controller 25 includes a micro-computer, various interface circuits, an A/D converter, a D/A converter and an amplifier. When the controller 25 detects that high-frequency vibrations (acceleration vibration) as compared with that in the engine shake, such as idle vibration or booming vibration are inputted to the vehicle body 35, the controller 25 outputs the drive signal y to the active engine mount 1 so that the active engine mount 1 generates the active supporting force which can reduces the vibrations.

In case that the active engine mount 1 is applied to a reciprocated four cylinder engine, the idle vibration and the booming vibration are mainly caused by the transmission of an engine vibration of a second component of the engine rotation through the active engine mount 1 to the vehicle body 35. Accordingly, it is possible to reduce the vibration transmission ratio by generating and outputting the drive signal upon synchronizing the signal with the secondary component of the engine rotation.

A pulse signal generator 26 is installed to the power unit 30 and is electrically connected with the controller 25. The pulse signal generator 26 generates an impulse signal synchronized with the rotation of a crankshaft of the engine 30, for example, once by each 180 angle rotation of the crankshaft in case of the reciprocated four cylinder engine, and outputs as a reference signal x. The reference signal x is supplied to the controller 25 as a signal representative of a vibration generated at the power unit 30.

A load sensor 22 is disposed between the lower surface of the yoke 10 and the plate member 8a of the actuator case 8. The load sensor 22 detects a vibration force transmitted from the power unit 30 through the supporting elastomer 6. The load sensor 22 outputs the residual vibration signal $e_L$ through a harness 23b to the controller 25. A piezoelectric element, a magnetostrictive element and a strain gage are applicable to the load sensor 22.

An acceleration sensor 27 is disposed on a floor of a passenger compartment 36 of the vehicle. The acceleration sensor 27 outputs the residual vibration signal $e_A$ to the controller 25. The floor of the passenger compartment 36 corresponds to the member for surrounding or defining the passenger compartment 36.

The controller 25 calculates the drive signal y on the basis of the reference signal x and the residual vibration signals $e_L$ and $e_A$ according to the synchronous filtered-X LMS algorithm and outputs the calculated drive signal y to the active engine mount 1. That is, the controller 25 includes an adaptive digital filter W which variably changes a filter coefficient $W_i$ where i=0, 1, 2, . . . , I–1, and I is a number of tap. From a time that the newest reference signal x is inputted, at predetermined sampling-clock intervals, the filter coefficient $W_i$ of the adaptive digital filter W is in turn outputted as a drive signal y, and an appropriate updating process of the filter coefficient $W_i$ of the adaptive digital filter W is executed according to the reference signal x and the residual vibration signals $e_L$ and $e_A$.

An updating equation of the adaptive digital filter W is represented by the following equation (1) based on the Filtered-X LMS algorithm.

$$Wi(n+1)=Wi(n)-\mu R_A^T e(n) \quad (1)$$

wherein a term including (n) or (n+1) represents a value at time n or n+1, μ is a coefficient called as a convergence coefficient and related to the converging speed of the filter coefficient Wi and its stability. One of the residual reference signals $e_L$ and $e_A$ is selected as e according to the decision as to whether the driving force is transmitted to the driven wheels or not. Similarly one of the updating reference signals $R_L^T$ and $R_A^T$ is selected as $R^T$ according to the decision as to whether the driving force is transmitted to the driven wheels or not. The updating reference signals $R_L^T$ is theoretically, a value obtained by filter-processing the reference signal x by means of a model transfer function filter $C_L\hat{}$ which is a model of a transfer function $C_L$ between the electromagnetic actuator 10 of the active engine mount 1 and the load sensor 22. Since the magnitude of the reference signal x is "1", the updating reference signal $R_L^T$ corresponds to the sum of these impulse response wave forms at the time n in case that an impulse responses of the transfer function filter $C_L\hat{}$ are in turn generated synchronizing with the reference signals x. Similarly, the updating reference signals $R_A^T$ is theoretically, a value obtained by filter-processing the reference signal x by means of a model transfer function filter $C_A\hat{}$ which is a model of a transfer function $C_A$ between the electromagnetic actuator 10 of the active engine mount 1 and the acceleration sensor 27. Since the magnitude of the reference signal x is "1", the updating reference signal $R_A^T$ corresponds to the sum of these impulse response wave forms at the time n in case that an impulse responses of the transfer function filter $C_A\hat{}$ are in turn generated synchronizing with the reference signals x.

Theoretically, the drive signal y is generated by filtering the reference signal x by means of the adaptive digital filter W. Since the magnitude of the reference signal x is "1", by outputting each filter coefficient Wi of the adaptive digital filter W as a drive signal y in turn at predetermined sampling-clock intervals from a time that the newest reference signal x is inputted, the same result is obtained as in a case that the result of the filter process is taken as a drive signal y.

The vibration control system of the first embodiment further comprises a shift position sensor 28 for detecting a shift position of the automatic transmission of the power unit 30. The shift position sensor 28 outputs a shift position signal S indicative of the detected shift position to the controller 25. The controller 25 decides as to whether the shift position of the automatic transmission is put in D-position indicative of a drive position or in B-position indicative of a back position on the basis of the received shift position signal S. Further, the controller 25 selects one of the residual vibration signals $e_L$ and $e_A$ and one of the updating reference signals $R_L^T$ and $R_A^T$ as e and $R^T$ according to the decision of the shift position. More particularly, when the shift position signal S indicates that the shift position is not put in the D-position or B-position, the controller 25 decides that the driving force is not transmitted to the driven wheels and the vibration of the power unit 30 is mainly transmitted to the vehicle body 35 through the engine mounts including the active engine mount 1. Therefore, the control according to the residual reference signal $e_L$ is executed so that the vibration transmitted to the vehicle body 35 through the active engine mount 1 is reduced. In contrast, when the shift position signal S indicates that the shift position is put in one of the D-position and the B-position, the controller 25 decides that the drive force is transmitted to the driving wheels and the vibration of the power unit 30 is transmitted to the vehicle body 35 through a vibration transmitting member which does not include the engine mounts. Therefore, the control according to the residual vibration signal $e_A$ is executed so that the vibration transmitted to the passenger compartment 36 is reduced.

The manner of operation of the first embodiment of the vibration control system according to the present invention will be discussed hereinafter.

When the power unit 30 generates the engine-shake, the active engine mount 1 functions as a supporting device performing a high dynamic spring constant and a high damping force as a result of the proper selection of the orifice 5a. Accordingly, the shaking of the power unit 30 is damped by the active engine mount 1, and the magnitude of the vibration level of the vehicle body 35 is decreased. In this case, it is not necessary to positively displace the magnetic path member 12.

On the other hand, when the controller 25 detects that the vibration of the power unit 30 which vibration has a frequency higher than the idle vibration frequency and by which the fluid in the orifice 5a becomes static so as not to move the fluid between the main fluid chamber 15 and the auxiliary fluid chamber 16, the controller 25 executes a predetermined calculation process and outputs the drive signal y to the electromagnetic actuator 10. This will be discussed in detail with reference to a flowchart of FIG. 3 which shows a scheme of the processing executed by the controller 25 during the idle vibration or the booming vibration. One-cycle processing is executed synchronously with the reference signals x of an impulse train, and one sampling processing is executed synchronously with a clock-pulses of predetermined time intervals which are started at an input timing of the reference signal x.

First, at a step S101, the controller 25 executes a predetermined initialization. Then, the routine proceeds to a step S102 wherein the controller 25 calculates the updating reference signals $R_L{}^T$ and $R_A{}^T$ used for one-cycle processing on the basis of the transfer function filters $C_L\hat{}$ and $C_A\hat{}$.

At a step S103, the controller 25 clears a counter i which counts the number of output times of the drive signals y per one cycle (i=0). Then, the routine proceeds to a step S104.

At the step S104, the controller 25 outputs the filter coefficient Wi as the drive signal y to the exciting coil 10B of the electromagnetic actuator 10.

Next, the routine proceeds to a step S105 wherein the controller 25 reads in the residual vibration signals $e_L$ and $e_A$ and the shift position signal S with a present value of the counter i.

At a step S106, the controller 25 decides according to the shift position signal S as to whether the shift position of the automatic transmission is put in one of the D-position and the B-position. When the decision at the step S106 is "YES", the routine proceeds to a step S107 wherein the residual vibration signal $e_A$ is substituted for the residual signal e used in the updating of the adaptive digital filter W and wherein the reference signal $R_A{}^T$ is substituted for the updating reference signal $R^T$ used in the updating of the adaptive digital filter W. When the decision at the step S106 is "NO", the routine proceeds to a step S108 wherein the residual vibration signal $e_L$ is substituted for the residual signal e used in the updating of the adaptive digital filter W and wherein the updating reference signal $R_L{}^T$ is substituted for the updating reference signal $R^T$ used in the updating of the adaptive digital filter W.

Following the execution of the step S107 or S108, the routine proceeds to a step S109 wherein the controller 25 clears a counter j to 0 (j=0). The counter j is a counter for judging as to whether the updating calculation of the filter coefficient Wj of the adaptive digital filter W has been executed necessary times or not.

At a step S110, the controller 25 updates the j-th filter coefficient Wj of the adaptive digital filter W according to the above equation (1). After the execution of the updating process at the step S110, the routine proceeds to a step S111 wherein the controller 25 decides as to whether next reference signal x is inputted or not. When the controller 25 decides that the reference signal x is not inputted, the routine proceeds to a step S112 in order to execute an updating of next filter coefficient of the adaptive digital filter W or output processing of the drive signal y.

At the step S112, the controller 25 decides as to whether or not the counter j is greater than the times of the output Ty (more accurately, a value obtained by subtracting 1 from the times of the output Ty is applied since the counter j starts from 0). This decision is executed for deciding as to whether or not the filter coefficient Wi of the adaptive digital filter W is updated by the necessary times after the output of the drive signal y based on the filter coefficient Wi at the step S104. When the decision in the step S112 is "NO", the routine proceeds to a step S113 wherein the counter j is incremented (j=j+1). Then, the routine returns to the step S110 to repeatingly execute the above-mentioned processing. When the decision in the step S112 is "YES", that is, when it is decided that the filter coefficient of the adaptive digital filter W is updated by the necessary times, the routine proceeds to a step S114.

At the step S114, the controller 25 increments the counter i by 1 (i=i+1). Following this, the routine returns to the step S104 so as to execute the processing of the step S104 and await until the time period corresponding to the interval of the predetermined sampling clock is elapsed. After the elapse of the time period, the routine again returns to the step S104 to repeatingly execute the above-mentioned processing.

On the other hand, when the decision at the step S111 is "YES", the routine proceeds to a step S115 wherein the controller 25 stores i+1 as the newest output times Ty, and then the routine returns to the step S102.

As a result of the repeating execution of such processing, the filter coefficient Wi of the adaptive digital filter W is in turn supplied as the drive signal y from the controller 25 to the electromagnetic actuator 10 of the active engine mount 1 at predetermined sampling-clock intervals from a time that the reference signal x is inputted. As a result, although the magnetic force corresponding to the drive signal y is generated at the exciting coil 10B, the predetermined magnetic force due to the permanent magnet 10C has already been applied to the magnetic path member 12. Therefore, it may be considered that the magnetic force due to the exciting coil 10B functions to strengthen or weaken the magnetic force of the permanent magnet 10C. That is, in a condition that the drive signal y is not supplied to the exciting coil 10C, the magnetic path member 12 is displaced at a neutral position where the supporting force of the plate spring 11 and the magnetic force of the permanent magnet 10C are balanced. When the drive signal y is supplied to the exciting coil 10B in this neutral condition, the magnetic path member 12 is displaced in the direction that the clearance relative to the electromagnetic actuator 10 is increased if the magnetic force generated at the exciting coil 10B by the drive signal y is directed against the direction of the magnetic force of the permanent magnet 10C. Inversely, if the direction of the magnetic force generated at the exciting coil 10B is the same as that of the magnetic force of the permanent magnet 10C, the magnetic path member 12 is displaced so that the clearance relative to the electromagnetic actuator 10 is decreased.

Thus, the magnetic path member 12 is movable in the right and inverse directions. Since the volume of the main fluid chamber 15 is changed by the displacement of the magnetic path member 12 and the expansion spring of the supporting elastomer 6 is deformed due to this volume change, the supporting force active in the right and inverse directions is generated at the active engine mount 1. Each filter coefficient $W_i$ of the adaptive digital filter W is in turn updated by the equation (1) according to the synchronized type Filtered-X LMS algorithm. Therefore, after each filter coefficient Wi of the adaptive digital filter W is converged into an optimum value upon a predetermined time has elapsed, the idle vibration and the booming (echo) noises lo transmitted from the power unit 30 through the active engine mount 1 to the vehicle body 35 is decreased by supplying the drive signal y to the engine mount 1. Furthermore, since the residual vibration signal e and the updating reference signal $R^T$ used in the updating of the adaptive digital filter W are selected according to the decision at the step S106, the vibration control system according to the present invention suitably executes the vibration reducing process according to the vibrational state of the vehicle body 35.

It is most preferable to fully cancel the transmission of the vibration of the power unit 30 to the vehicle body 35 (or to set the transmission ratio of the vibration to zero) in order to reduce the vibration of the vehicle body 35. However, in a condition that the driving force of the power unit 30 is transmitted to the driving wheels, a vibration transmission route except for the active engine mount 1 is established in the vehicle. Therefore, even if the vibration through the active engine mount 1 is fully canceled, a vibration mode for bending the frame of the vehicle body 35 may be excited. In order to reduce such bending vibration to the frame of the vehicle body 35A, it is preferable to apply a damping force of the active dynamic vibration reducer. Therefore, when the decision at the step S106 is "YES", that is, when the controller 25 decides that the shift position is put in one of the drive position and the back position so as to transmit the driving force to the driving wheels, the routine proceeds to the step S107 wherein the residual vibration signal $e_A$ detected by the acceleration sensor 27 and the reference signal $R_A^T$ are selected to be substituted for the residual signal e and the reference signal $R^T$ used in the updating of the adaptive digital filter W.

By the repeating execution of the step S107 and the step S110, the filter coefficient Wi of the adaptive digital filter W is updated so as to decrease the magnitude of the residual vibration signal $e_A$. Therefore, the active supporting force generated by the active engine mount 1 functions as a vibration force applied to the power unit 30 so as to reduce the vibration transmitted from the power unit 30 through various circuits to the vehicle body 35. The active engine mount 1 and the power unit 30 functions as the active dynamic vibration reducer so as to execute vibration damping function to the vehicle body 35.

In contrast, when the driving force is not transmitted to the driving wheels, the vibration of the vehicle body 35 is mainly transmitted through the engine mounts to the vehicle body 35. By sufficiently reducing the vibration through the active engine mount 1, the bending vibration mode of the frame of the vehicle body 35 is not excited. Therefore, when the decision at the step S106 is "NO", the routine proceeds to the step S108 wherein the residual vibration signal $e_L$ detected by the load sensor 22 and the updating reference signal $R_L^T$ are selected to be substituted for the residual signal e and the updating reference signal $R^T$ used in the updating of the adaptive digital filter W.

By the repeating execution of the step S108 and the step S110, the filter coefficient Wi of the adaptive digital filter W is updated so as to decrease the magnitude of the residual vibration signal $e_L$. Therefore, the active supporting force generated by the active engine mount 1 functions as a power for canceling the vibration transmitted from the power unit 30 through the active engine mount 1 to the vehicle body 35. The transmission ratio of the vibration from the power unit 30 to the vehicle body 35 is reduced so that the vibration level of the vehicle body 35 is decreased.

With this first embodiment of the vibration control system according to the present invention, in case that the possibility of the excitation of the bending vibration mode of the vehicle body frame cannot be lowered by reducing the vibration through the active engine mount 1 since the vibration transmission route except for the active engine mount 1 is established, the active engine mount 1 is controlled to function as an actuator of the active dynamic vibration reducer. Therefore, even if the bending vibration mode of the vehicle body frame is excited by the vibration through the suspensions of the driving wheels, the level of the vibration transmitted to the passenger compartment 36 is decreased by the function of the active dynamic vibration reducer. On the other hand, in case that the vibration level of the vehicle body 35 is reduced by decreasing the vibration through the active engine mount 1 since the vibration transmission route except for the active engine mount 1 is not established, the active engine mount 1 is controlled to decrease the vibration just below thereof. Therefore, an effective vibration reducing control, which performs small phase-delay and high-stability, is executed to largely decrease the vibration level of the vehicle body 35.

Since the load sensor 22 is applied as a means for detecting the vibration transmitted to the vehicle body 35 through the active engine mount 1, it becomes possible to supply the residual vibration signal $e_L$ indicative of the accurate amplitude of the vibration to the controller 25. Therefore, the controller 25 generates and outputs the drive signal y reflecting the accurate vibration amplitude so that the electromagnetic actuator 10 displaces the magnetic path member 12 at the amplitude in proportion to the received vibration magnitude. Accordingly, it becomes possible to preferably execute the vibration reducing control in the range from the idle vibration (20–30 Hz) to the booming vibration (80–800 Hz).

Since the load sensor 22 is build in the active engine mount 1 so as not to receive the tightening force of the bolt 9, the load durability required to the load sensor 22 becomes small so that the load sensor 22 may be a small type. This is preferable to a small-sized active engine mount 1 and decreases the production cost of the active engine mount 1. Furthermore, the installation to the vehicle is improved by the integral structure of the load sensor 22 and the active engine mount 1.

Since the first embodiment is arranged to detect on the basis of the shift position of the automatic transmission as to whether the driving force is transmitted to the driving wheels or not, the detection operation is easily executed.

In this first embodiment, the processing shown in FIG. 3 corresponds to the control means, the load sensor 22 corresponds to the vehicle body vibration detecting means, the acceleration sensor 27 corresponds to the passenger compartment vibration detecting means, and the shift position sensor 28 and the processing at the step S106 corresponds to the driving force detecting means.

Figure 4:
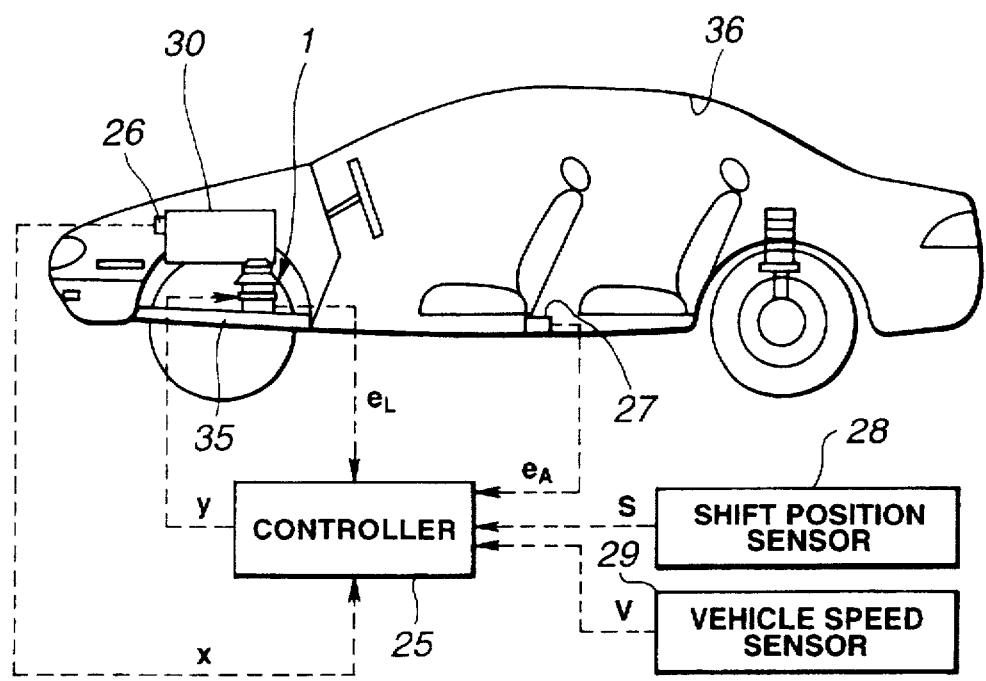
FIG. 4 is a schematic side view which shows a second embodiment of the vibration control apparatus according to the present invention.
Figure 5:
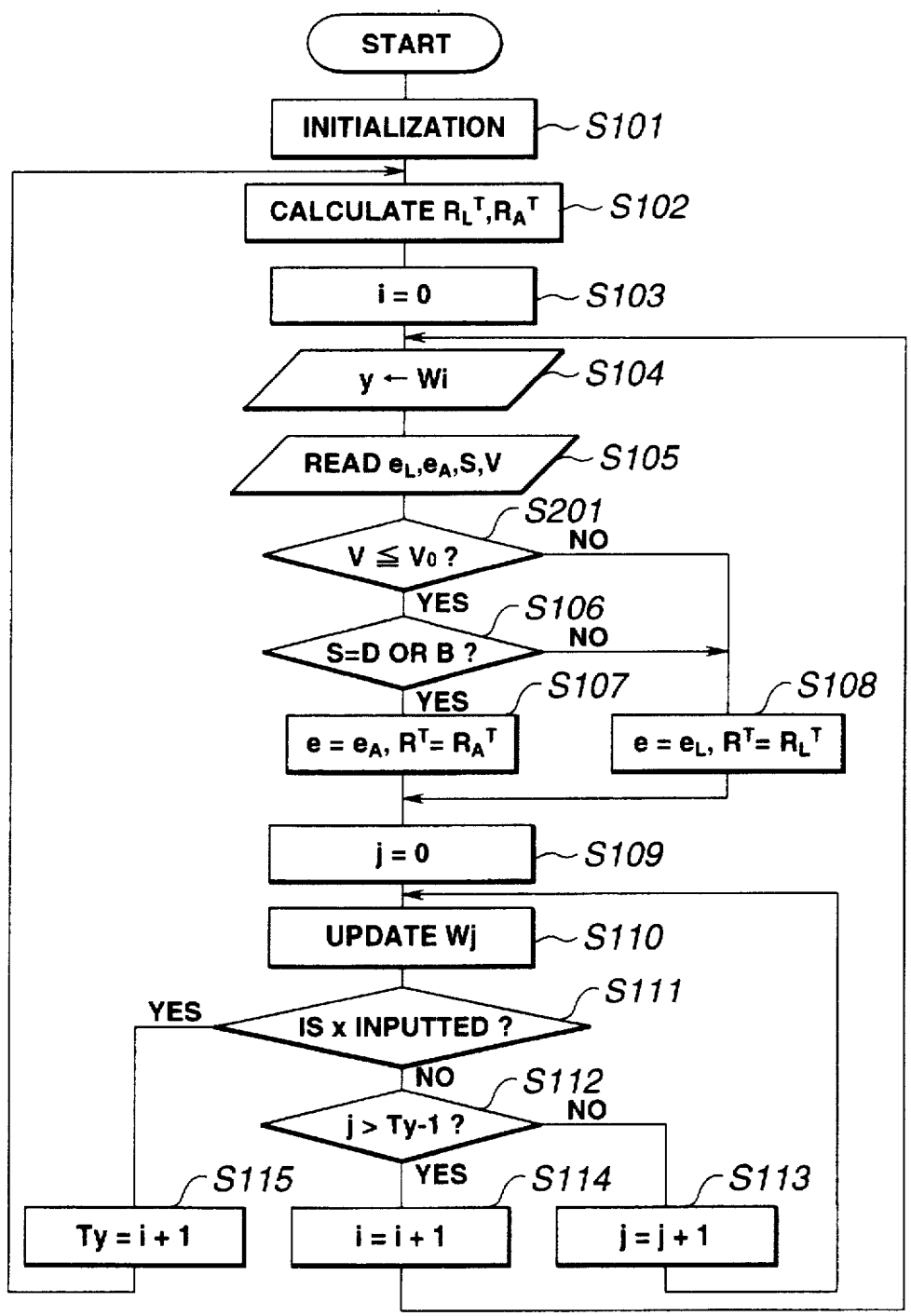
FIG. 5 is a flowchart which shows processing executed in the controller of the second embodiment.

Referring to FIGS. 4 and 5, there is shown a second embodiment of the vibration control system according to the present invention.

As shown in FIG. 4, the construction of the second embodiment is generally the same as that of the first embodiment except that a vehicle speed sensor 29 is further connected to the controller 25 so that a vehicle speed signal detected by the vehicle speed sensor 29 is supplied to the controller 25. In the second embodiment, the same components and elements are designated by the same reference numerals, and the explanation thereof is omitted herein.

The controller 25 executes the processing shown by a flowchart of FIG. 5.

As is the same as that in the first embodiment, the steps S101 to S104 are executed.

Following to the execution of the step S104, the routine proceeds to a step S105 wherein the controller 25 reads the residual vibration signals $e_L$ and $e_A$, the shift position signal S and the vehcie speed signal V.

Then, the routine proceeds to a step S201 wherein the controller 25 decides as to whether or not the vehicle speed is smaller than or equal to a predetermined speed $V_0$ which is an extremely low speed decided as the vehicle is practically stopped on the basis of the vehicle speed signal V. When the decision at the step S201 is "YES", the routine proceeds to a step S106. When the decision at the step S201 is "NO", the routine proceeds to a step S108. The processing following to the steps S107 and S108 is the same as the processing executed in the first embodiment.

That is, When the vehicle speed is smaller than or equal to the extremely low speed regarded as being in a stopped condition and when the driving force is transmitted to the driving wheels, the routine proceeds to the step S107 wherein the controller 25 executes the control on the basis of the residual vibration signal $e_A$ outputted by the acceleration sensor 27. As a typical case that the routine proceeds to the step S107, there are a case that the shift position of the automatic transmission is put in the drive position and the vehicle is stopped by the depression of the brake pedal and a case that the manual transmission equipped vehicle is stopped on a sloop by keeping a clutch in a slipping engaged condition. In such cases, since the driving wheels are not rotated even though the driving force is transmitted to the driving wheels, the rotation of a jointing portion of the driving force transmitting system is limited and therefore the engine vibration and the deviation of the driving force tends to be inputted to the vehicle body 35 through the driving force transmitting system and the suspensions.

From the above-analysis, when the decisions of both the steps S201 and S106 are "YES", it can be decided that the vehicle body 35 is put in a condition that the bending vibration mode of the vehicle body frame tends to be excited by means of the vibration through the vibration transmission route except for the active engine mount 1. Inversely, when one of the decisions at the steps S201 and S106 is "NO", it can be decided that the vibration transmission route except for the active engine mount 1 is not established or that it is hard that the bending vibration mode of the frame of the vehicle body 35 is excited since the vibration transmission ratio through the vibration transmission route is extremely small.

By executing the processing at the step S107 or S108 according to the decision at the steps S201 and S106, the vibration control system according to the present invention further accurately executes the vibration reducing processing according to the vibrational state of the vehicle body 35. In this second embodiment, the processing shown in FIG. 5 corresponds to control means, and the vehicle speed sensor 29 and the step S201 constitutes vehicle speed detecting means.

Figure 6:
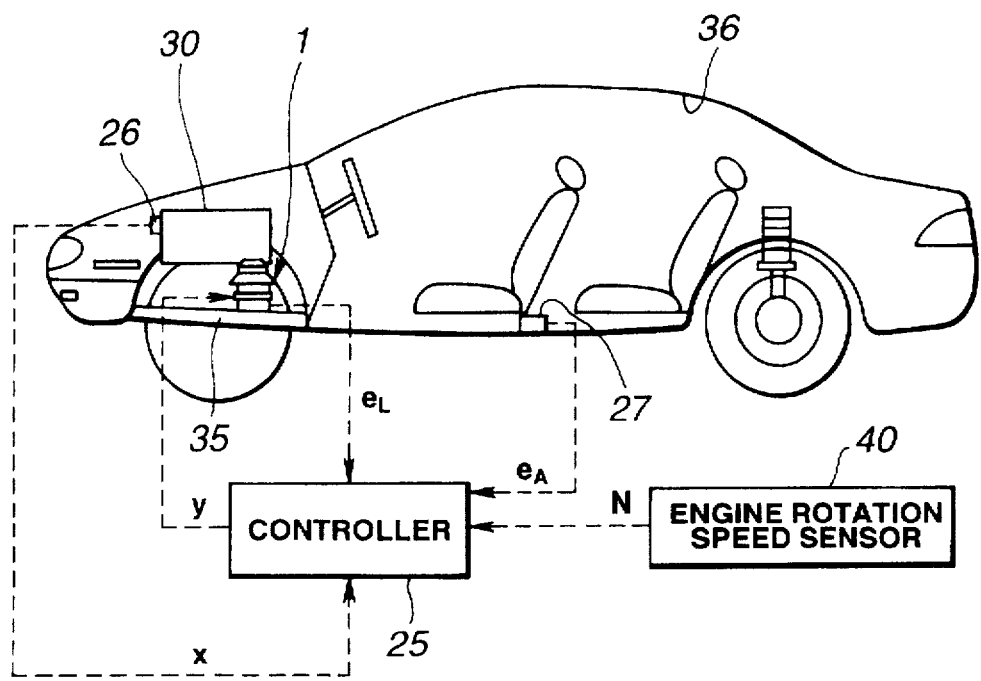
FIG. 6 is a schematic side view which shows a third embodiment of the vibration control apparatus according to the present invention.
Figure 7:
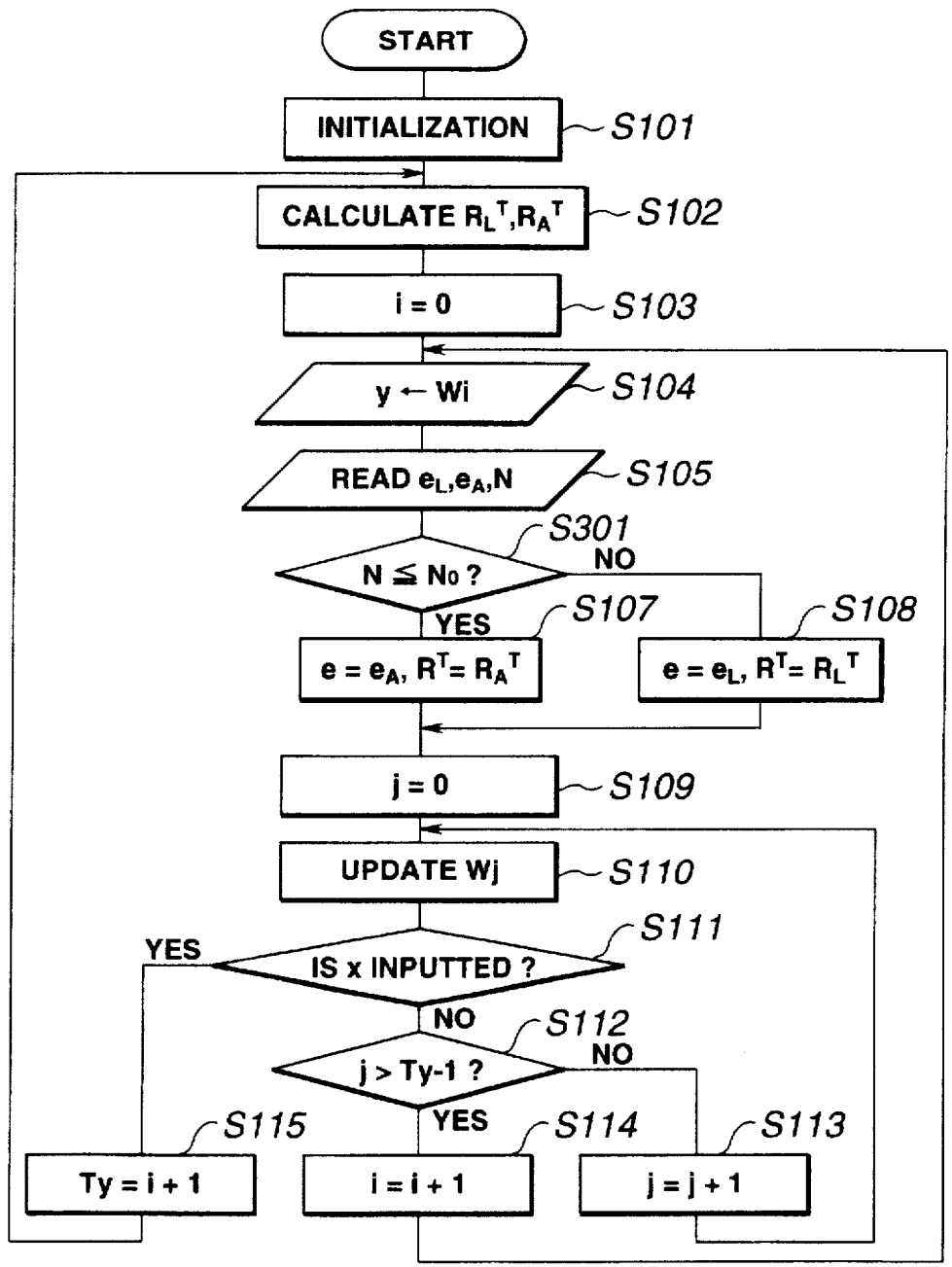
FIG. 7 is a flowchart which shows processing executed in the controller of the third embodiment.

Referring to FIGS. 6 and 7, there is shown a third embodiment of the vibration control system according to the present invention.

As shown in FIG. 6, the construction of the third embodiment is generally the same as that of the first embodiment except that an engine rotation speed sensor 40 for detecting an engine rotation speed is connected to the controller 25 to supply an engine rotation speed signal N to the controller 25, and that the shift position sensor 28 is omitted herein. In the third embodiment, the same components and elements as those of the first embodiment are designated by the same reference numerals, and the explanation thereof is omitted herein.

The controller 25 executes the processing shown by a flowchart of FIG. 7.

As is the same as that in the first embodiment, the steps S101 to S104 are executed.

Following to the execution of the step S104, the routine proceeds to a step S105 wherein the controller 25 reads the residual vibration signals $e_L$ and $e_A$, the engine rotation speed signal N.

Then, the routine proceeds to a step S301 wherein the controller 25 decides as to whether or not the engine rotation speed is smaller than or equal to a predetermined rotation speed $N_0$. When the decision at the step S301 is "YES", the routine proceeds to a step S107. When the decision at the step S301 is "NO", the routine proceeds to a step S108. The processing following to the steps S107 and S108 is the same as the processing executed in the first embodiment.

The predetermined rotation speed $N_0$ at which a frequency of a combustion basic order of the engine generally corresponds to the frequency at which the bending vibration mode of the frame of the vehicle body 35 is excited. For example, in case of a reciprocated four-cylinder engine, the combustion basic order of this engine is a secondary of the engine rotation, and the frequency at which the bending vibration mode of the vehicle body frame is able to be excited is a frequency smaller than 20 to 25 Hz. Therefore, the predetermined rotation speed $N_0$ may be set at the rotation speed at which the frequency of the secondary engine rotation speed becomes such as 25 Hz. Similarly, in case of the other engine, the predetermined engine rotation speed $N_0$ may be determined by similar way.

In this embodiment, the frequency, at which the bending vibration mode of the vehicle body frame is able to be excited, is already known. In addition, the frequency transmitted form the power unit 30 to the vehicle body 35 is equal to the frequency of the combustion basic order of the engine. It was remarked that the frequency of the combustion basic order of the combustion in the engine is easily known from the type of the engine and the engine rotation speed. Therefore, at the step S301, the controller 25 decides on the basis of the engine rotation speed signal N as to whether the vibration transmitted from the power unit 30 to the vehicle body 35 is practically able to excite the bending vibration mode of the vehicle body frame. When the controller 25 decides that it is easy to excite the bending vibration mode of the vehicle body frame, that is, when the decision at the step S301 is "YES", the routine proceeds to the step S107 in order to execute the control for effectively suppressing the bending vibration mode of the vehicle body frame, that is, the control for functioning the active engine mount 1 as an actuator of the active dynamic vibration reducer. At the step S107, the residual vibration signal $e_A$ is selected as e used in the updating processing of the adaptive digital filter W. Regarding the bending vibration mode of the vehicle body frame, the vehicle body 35 may be regarded as a rigid body. Therefore, the floor vibration in the passenger compartment 36 located apart from the active dynamic vibration reducer is reduced by the vibration reducing force inputted to the vehicle body 35. The vibration reducing force is generated by functioning the active engine mount 1 and the power unit 30 as the active dynamic vibration reducer.

In contrast, when the decision at the step S301 is "NO", the frequency of the vibration transmitted from the power unit 30 to the vehicle body 35 is high as compared with the frequency which is able to excite the bending vibration mode of the vehicle body frame. Therefore, in such vibrational state, the vehicle body 35 can be regarded as a structural body constructed by a plurality of panels elastically connected with each other, and the vibration reducing force of the active dynamic vibration reducer cannot effectively function, but reducing the input vibration to the vehicle body 35 effectively functions to reduce the vibration.

Since it is preferable to set the active engine mount 1 so as to decrease the vibration just below the active engine mount 1 in order to decrease the input vibration to the vehicle body 35, the routine proceeds to the step S108 wherein the residual vibration signal $e_L$ is selected as e used in the updating processing of the adaptive digital filter W. This high-frequency vibration is generated when the vehicle is traveling while the engine is rotated at a rotation speed greater than an idling rotation speed. The vibration generated at the power unit 30 is mainly transmitted through the engine mounts including the active engine mount 1 to the vehicle body 35. Therefore, by controlling the active engine mount 1 so as to cancel the vibration thereof, the vibration of the vehicle body 35 is largely reduced.

With this third embodiment of the vibration control system according to the present invention, the vibrational state of the vehicle body 35 is detected on the basis of the frequency of the vibration transmitted from the power unit 30 to the vehicle body 35 so that the effective vibration reducing control is executed to largely decrease the vibration level of the vehicle body 35 as a whole. In this third embodiment, the processing shown in FIG. 7 corresponds to the control means, and the engine rotation speed detecting means is constituted by the engine rotation speed sensor 40 and the step S301.

Figure 8:
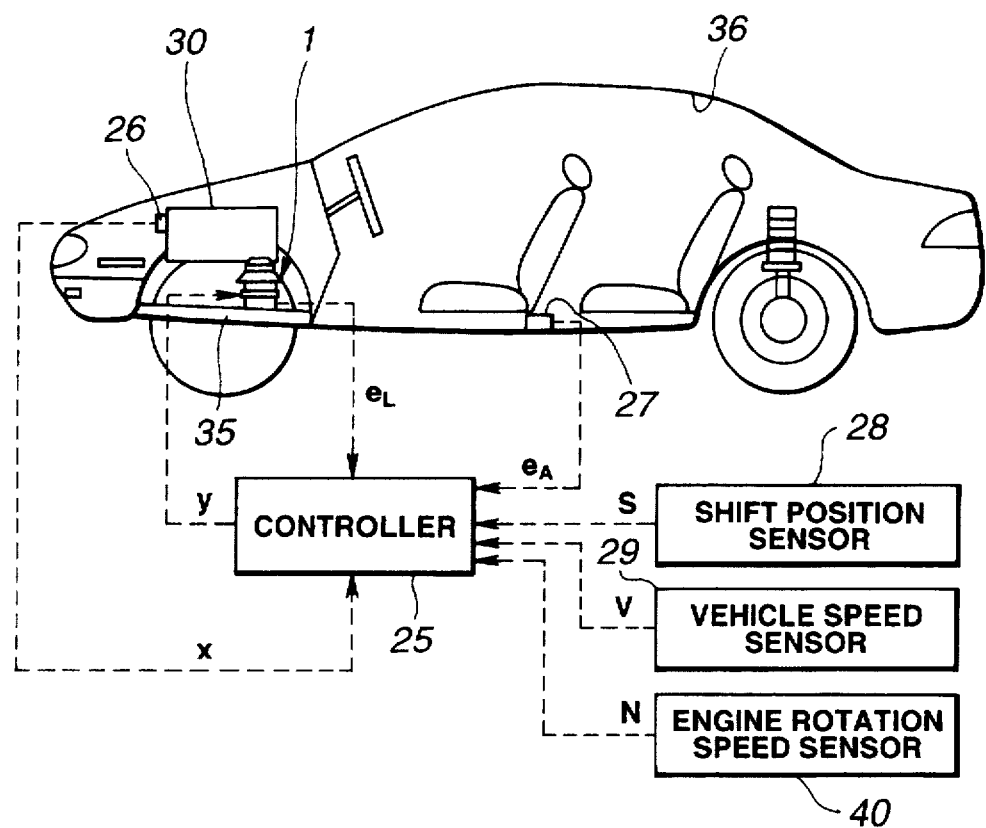
FIG. 8 is a schematic side view which shows a fourth embodiment of the vibration control apparatus according to the present invention.
Figure 9:
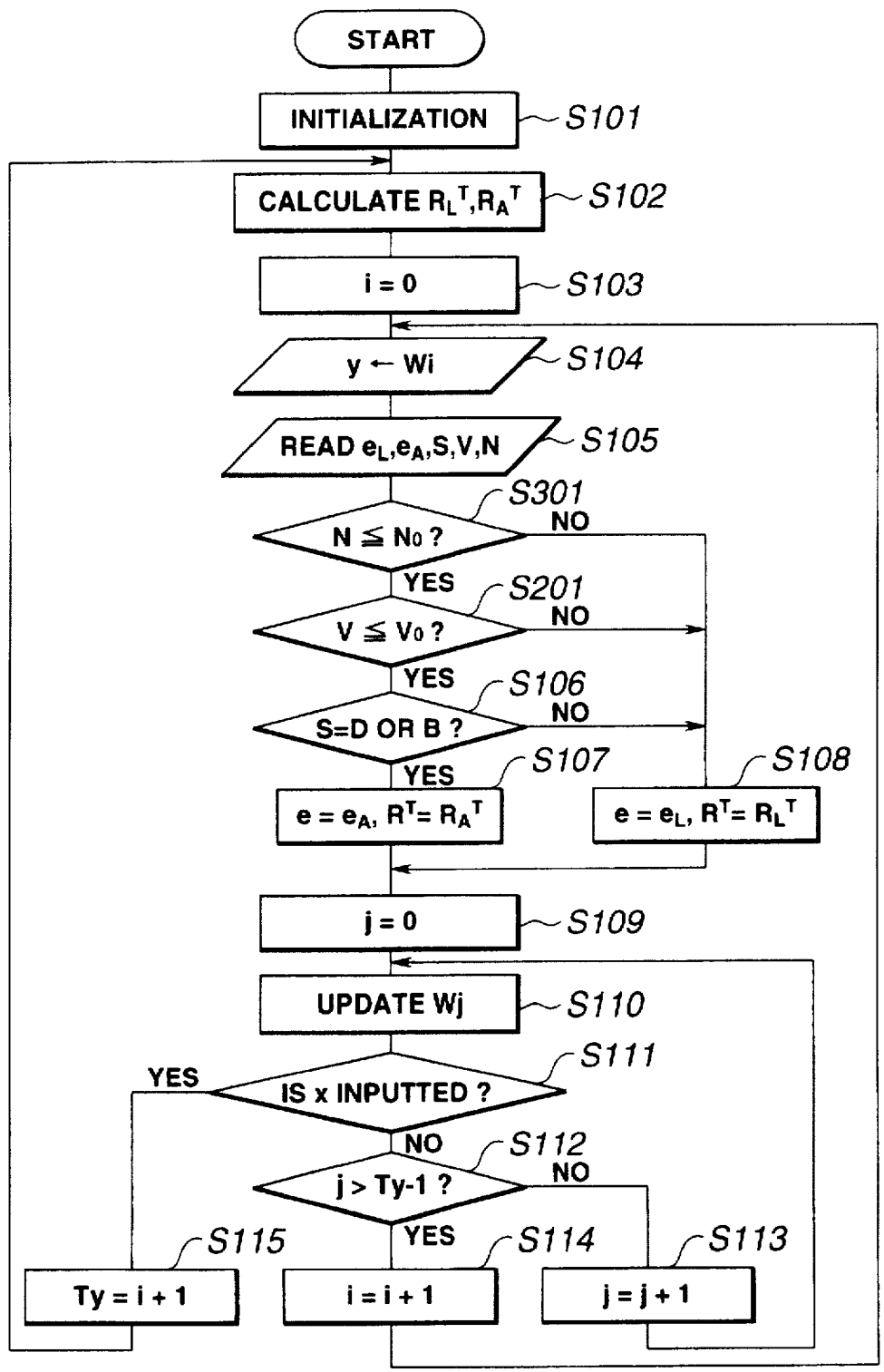
FIG. 9 is a flowchart which shows processing executed in the controller of the third embodiment.

Referring to FIGS. 8 and 9, there is shown a fourth embodiment of the vibration control system according to the present invention.

As shown in FIG. 8, the construction of the fourth embodiment is generally the same as that of the first embodiment except that a vehicle speed sensor 29 for detecting an vehicle speed and an engine rotation speed sensor 40 for detecting an engine rotation speed are installed so as to be connected to the controller 25. The vehicle speed sensor 29 detects the vehicle speed and outputs a vehicle speed signal V indicative of the vehicle speed to the controller 25. The engine rotation speed sensor 40 detects an engine rotation speed and outputs an engine rotation speed signal N indicative of the engine rotation speed to the controller 25.

In the fourth embodiment, the same components and elements as those of the first embodiment are designated by the same reference numerals, and the explanation thereof is omitted herein.

The controller 25 executes the processing shown by a flowchart of FIG. 9.

As is the same as that in the first embodiment, the steps S101 to S104 are executed.

Following to the execution of the step S104, the routine proceeds to a step S105 wherein the controller 25 reads the residual vibration signals $e_L$ and $e_A$, the shift position signal S, the vehicle speed signal V and the engine rotation speed signal N.

Then, the routine proceeds to a step S301 wherein the controller 25 decides as to whether or 30 not the engine rotation speed is smaller than or equal to a predetermined rotation speed $N_0$. When the decision at the step S301 is "YES", the routine proceeds to a step S201. When the decision at the step S301 is "NO", the routine proceeds to a step S108.

At the step S201, the controller 25 decides as to whether or not the vehicle speed is smaller than or equal to a predetermined speed $V_0$ which is an extremely low speed decided as the vehicle is practically stopped on the basis of the vehicle speed signal V. When the decision at the step S201 is "YES", the routine proceeds to a step S106. When the decision at the step S201 is "NO", the routine proceeds to a step S108. The processing following to the steps S107 and S108 is the same as the processing executed in the first embodiment.

The predetermined rotation speed $N_0$ at which a frequency of the combustion basic order of the engine generally corresponds to the frequency at which the bending vibration mode of the frame of the vehicle body 35 is excited.

In this fourth embodiment, only when the frequency of the vibration from the power unit 30 is a frequency which is able to excite the bending vibration mode of the vehicle body frame, the vehicle speed is practically smaller than the extremely low speed distinguished as the vehicle is stopped and when the driving force is transmitted to the driving wheels, the routine proceeds to the step S107 to execute the control on the basis of the residual vibration signal $e_A$. Therefore, only when the bending vibration mode of the vehicle body frame is most likely to be excited, the control in which the active engine mount 1 functions as an actuator of the active dynamic vibration reducer is executed. With this fourth embodiment, the proper vibration reducing processing according to the vibrational state of the vehicle body 35 is more accurately executed as compared with the processing of the first to third embodiment. The processing shown in FIG. 9 corresponds to the control means.

Although the third and fourth embodiments according to the present invention have been shown and described such that the controller 25 uses the engine rotation speed signal N outputted by the engine rotation speed sensor 40 to execute the decision at the step S301, it will be understood that such supply of the engine rotation speed signal N to the controller 25 may be omitted by adding a calculating processing for obtaining the engine rotation speed on the basis of the input interval of the reference signal x which is based on the engine rotation speed. In such case, since the cycle period of the reference signal x corresponds the engine rotation speed, the decision at the step S301 may be executed from the cycle period of the reference signal x by previously obtaining the exchanged value of the predetermined rotation speed $N_0$ to the cycle period of the reference signal x.

Figure 10:
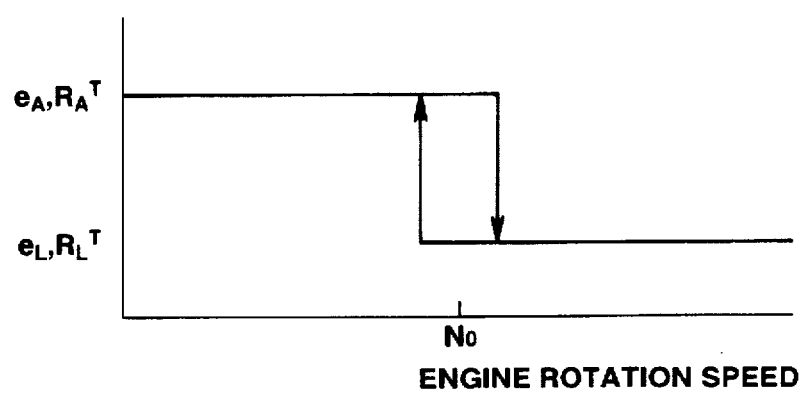
FIG. 10 is a graph which shows a relationship between the engine rotation speed and the threshold values.

While the second to fourth embodiments according to the present invention have been shown and described such that the threshold values for the decision at the steps S201 and S301, such as the predetermined vehicle speed $V_0$ and the predetermined engine rotation speed $N_0$ are fixed, it will be understood that such threshold values may be selected to have a hysteresis. For example, in case of the decision at the step S301, if the threshold is determined as shown in FIG. 10 so as to perform hysteresis with regard to the predetermined rotation speed $N_0$, it becomes possible to prevent the hunting due to the control switching in the vicinity of the predetermined rotation speed $N_0$.

Although the above-mentioned embodiments have been shown and described to use the load sensor 22 build-in the active engine mount 1 as a vehicle body vibration detecting means, it will be understood that it is not limited to the load sensor 22 and may be a load sensor installed between the active engine mount 1 and the vehicle body 35 or an acceleration sensor installed in the vicinity of the active engine mount 1 installed vehicle body 35. If the acceleration sensor is used as the vehicle body vibration detecting means, the degree of freedom in the located position thereof is increased.

Further, while the above-mentioned embodiments have been shown and described to use the acceleration sensor 27 as a passenger compartment vibration detecting means, it will be understood that a microphone for detecting noises in the passenger compartment 36 may be used as the passenger compartment vibration detecting means from the viewpoint that the passenger compartment vibration detecting means may be a means for detecting the vibration of the member constituting the passenger compartment 36.

Although the above-mentioned embodiments have been shown and described such that the drive signal to the active engine mount 1 is generated on the basis of the synchronous Filtered-X LMS algorithm, it will be understood that the other algorithm may be used, such as a normal Filtered-X algorithm or a normal feedback control according to the output from the load sensor 22 or acceleration sensor 27.

Although the first, second and third embodiment have been shown and described such that the controller 25 decides as to whether the driving force is applied to the de-driving wheels on the basis of the shift position of the automatic transmission, it will be understood that the present invention is not limited to this and may be arranged to detect a torsional torque of a drive shaft or propeller shaft and to decide as to whether the driving force is transmitted to the driving wheels on the basis of the detected torsional torque. In such a case, it becomes possible that the vibration control system is applied to a manual-transmission equipped vehicle. As a torsional torque detecting means, it is preferable to use the devices shown in Japanese Patent Provisional Publication Nos. 64-35329, 64-3531 and 64-3530.

What is claimed is:

1. A method for controlling an active engine mount installed between the a power unit and a vehicle body of a vehicle, comprising the steps of:
    detecting as to whether a bending vibration mode of a vehicle body frame tends to be excited;
    controlling the active engine mount according to a vibration of a member surrounding a passenger compartment of the vehicle when the bending vibration mode of a vehicle body frame tends to be excited; and
    controlling the active engine mount according to a vibration transmitted from the power unit to the vehicle body through the active engine mount when the bending vibration mode of the vehicle body frame does not tend to be excited.

2. An apparatus for controlling an active engine mount installed between a power unit and a vehicle body of a vehicle, said apparatus comprising:
    means for detecting as to whether a bending vibration mode of a vehicle body frame tends to be excited;
    means for controlling the active engine mount according to the vibration of a member defining a passenger compartment of the vehicle when the bending vibration mode of a vehicle body frame tends to be excited; and
    means for controlling the active engine mount according to a vibration transmitted from the power unit to the vehicle body through the active engine mount when the bending vibration mode of the vehicle body frame does not tends to be excited.

3. A vibration control apparatus for a vehicle equipped with a power unit and a vehicle body, said vibration control apparatus comprising:
    an active engine mount disposed between the power unit and the vehicle body;
    vehicle body vibration detecting means for detecting a vibration transmitted from the power unit to the vehicle body through said active engine mount;
    passenger compartment vibration detecting means for detecting a vibration of a member defining a passenger compartment of the vehicle;
    drive force detecting means for detecting as to whether driving force of the power unit is transmitted to driving wheels; and
    control means controlling said active engine mount so as to reduce the vibration detected by said passenger compartment vibration detecting means when said drive force detecting means detects that the driving force is transmitted to the driving wheels, said controlling means controlling said active engine mount so as to reduce the vibration detected by said vehicle body vibration detecting means when said drive force detecting means detects that the driving force is not transmitted to the driving wheels.

4. A vibration control apparatus as claimed in claim 3, further comprising vehicle speed detecting means for detecting as to whether a vehicle speed is smaller than a predetermined speed, said control means controlling said active engine mount so as to reduce the vibration detected by said passenger compartment vibration detecting means when said vehicle speed detecting means detects that the vehicle speed is smaller than the predetermined speed, said controlling means controlling said active engine mount so as to reduce the vibration detected by said vehicle body vibration detecting means when said vehicle speed detecting means detects that the vehicle speed is not smaller than the predetermined speed.

5. A vibration control apparatus as claimed in claim 3, wherein said drive force detecting means detects as to whether the driving force is transmitted to the driving wheels on the basis of a shift position of an automatic transmission.

6. A vibration control apparatus as claimed in claim 3, wherein said drive force detecting means detects as to whether the driving force is transmitted to the driving wheels on the basis of a torsional torque of a driving force transmitting system for transmitting the driving force from an engine and the driving wheels.

7. A vibration control apparatus for a vehicle equipped with a power unit and a vehicle body, said vibration control apparatus comprising:
    an active engine mount disposed between the power unit and the vehicle body;
    vehicle body vibration detecting means for detecting a vibration transmitted from the power unit to the vehicle body through said active engine mount;
    passenger compartment vibration detecting means for detecting a vibration of a member defining a passenger compartment of the vehicle;
    engine rotation speed detecting means for detecting as to whether an engine rotation speed is smaller than a predetermined rotation speed where the frequency of the combustion basic order of an engine corresponds to a frequency which enables the bending vibration mode of the vehicle body frame to be excited; and
    control means controlling said active engine mount so as to reduce the vibration detected by said passenger compartment vibration detecting means when said engine rotation speed detecting means detects that the engine rotation speed is smaller than the predetermined rotation speed, said controlling means controlling said active engine mount so as to reduce the vibration detected by said vehicle body vibration detecting means when said engine rotation speed detecting means detects that the engine rotation speed is not smaller than the predetermined rotation speed.

8. A vibration control apparatus as claimed in claim 7, further comprising drive force detecting means for detecting as to whether a driving force is transmitted to driving wheels and vehicle speed detecting means for detecting as to whether the vehicle speed is smaller than a predetermined speed, said control means controlling said active engine mount so as to reduce the vibration detected by said passenger compartment vibration detecting means when said drive force detecting means detects that the driving force is transmitted to the driving wheels and said vehicle speed detecting means detects that the vehicle speed is smaller than the predetermined speed, said controlling means controlling said active engine mount so as to reduce the vibration detected by said vehicle body vibration detecting means when said drive force detecting means detects that the driving force is not transmitted to the driving wheels and said vehicle speed detecting detects that the vehicle speed is not smaller than the predetermined speed.

9. An apparatus for controlling an active engine mount installed between a power unit and a vehicle body of a vehicle, said apparatus comprising:
   a bending vibration mode detector detecting as to whether a bending vibration mode of a vehicle body frame tends to be excited; and
   a controller controlling the active engine mount according to the vibration of a member surrounding a passenger compartment of the vehicle when the bending vibration mode of a vehicle body frame tends to be excited, said controller controlling the active engine mount according to the vibration transmitted from the power unit to the vehicle body through the active engine mount when the bending vibration mode of the vehicle body frame does not tend to be excited.

10. A vibration control apparatus for a vehicle equipped with a power unit and a vehicle body, said vibration control apparatus comprising:
   an active engine mount disposed between the power unit and the vehicle body;
   a vehicle body vibration detector detecting a vibration transmitted from the power unit to the vehicle body through said active engine mount;
   a passenger compartment vibration detector detecting a vibration of a member defining a passenger compartment of the vehicle;
   a drive force detector detecting as to whether driving force of the power unit is transmitted to driving wheels; and
   a controller controlling said active engine mount so as to reduce the vibration detected by said passenger compartment vibration detector when said drive force detector detects that the driving force is transmitted to the driving wheels, said controller controlling said active engine mount so as to reduce the vibration detected by said vehicle body vibration detector when said drive force detector detects that the driving force is not transmitted to the driving wheels.

11. A vibration control apparatus as claimed in claim 10, further comprising a vehicle speed detector which detects as to whether a vehicle speed is smaller than a predetermined speed, said controller controlling said active engine mount so as to reduce the vibration detected by said passenger compartment vibration detector when said vehicle speed detector detects that the vehicle speed is smaller than the predetermined speed, said controller controlling said active engine mount so as to reduce the vibration detected by said vehicle body vibration detector when said vehicle speed detector detects that the vehicle speed is not smaller than the predetermined speed.

12. A vibration control apparatus as claimed in claim 10, wherein said drive force detector detects as to whether the driving force is transmitted to the driving wheels on the basis of a shift position of an automatic transmission.

13. A vibration control apparatus as claimed in claim 10, wherein said drive force detector detects as to whether the driving force is transmitted to the driving wheels on the basis of a torsional torque of a driving force transmitting system for transmitting the drive power from an engine and the driving wheels.

14. A vibration control apparatus for a vehicle equipped with a power unit and a vehicle body, said vibration control apparatus comprising:
   an active engine mount disposed between the power unit and the vehicle body;
   a vehicle body vibration detector detecting a vibration transmitted from the power unit to the vehicle body through said active engine mount;
   a passenger compartment vibration detector detecting a vibration of a member defining a passenger compartment of the vehicle;
   an engine rotation speed detector detecting as to whether an engine rotation speed is smaller than a predetermined rotation speed; and
   a controller controlling said active engine mount so as to reduce the passenger compartment vibration when the engine rotation speed is smaller than the predetermined rotation speed and so as to reduce the vehicle body vibration when the engine rotation speed is greater than the predetermined rotation speed, the predetermined rotation speed being defined by the frequency of the combustion basic order of an engine which frequency corresponds to a frequency enabling the bending vibration mode of the vehicle body frame to be excited.

15. A vibration control apparatus as claimed in claim 14, further comprising a drive force detector and a vehicle speed detector, said controller controlling said active engine mount so as to reduce the passenger compartment vibration when the engine rotation speed is smaller than the predetermined rotation speed, when the driving force is transmitted to the driving wheels and when the vehicle speed is smaller than the predetermined speed, said controller controlling said active engine mount so as to reduce the vehicle body vibration when the engine rotation speed is greater than the predetermined rotation speed, when the driving force is not transmitted to the driving wheels or when the vehicle speed is greater than the predetermined speed.

16. A vibration control apparatus for a vehicle equipped with a power unit and a vehicle body, said vibration control apparatus comprising:
   an active engine mount disposed between the power unit and the vehicle body;
   a vehicle body vibration detector detecting a vibration transmitted from the power unit to the vehicle body through said active engine mount;
   a passenger compartment vibration detector detecting a vibration of a member defining a passenger compartment of the vehicle;

a drive force detector detecting as to whether driving force of the power unit is transmitted to driving wheels; and a controller controlling said active engine mount so as to reduce the vibration detected by said vehicle body vibration detector when said drive force detector detects that the driving force is not transmitted to the driving wheels.

17. A vibration control apparatus as claimed in claim 16, wherein said controller controlling said active engine mount so as to reduce the vibration detected by said passenger compartment vibration detector when said drive force detector means detects that the driving force is transmitted to the driving wheels.

18. A vibration control apparatus as claimed in claim 16, further comprising a vehicle speed detector which detects as to whether a vehicle speed is smaller than a predetermined speed, said controller controlling said active engine mount so as to reduce the vibration detected by said passenger compartment vibration detector when said vehicle speed detector detects that the vehicle speed is smaller than the predetermined speed, said controller controlling said active engine mount so as to reduce the vibration detected by said vehicle body vibration detector when said vehicle speed detector detects that the vehicle speed is not smaller than the predetermined speed, said controller controlling said active engine mount so as to reduce the vibration detected by said vehicle body vibration detector when said drive force detector detects that the driving force is not transmitted to the driving wheels or when said vehicle speed detector detects that the vehicle speed is not smaller than the predetermined speed.

19. A vibration control apparatus for a vehicle equipped with a power unit and a vehicle body, said vibration control apparatus comprising:

an active engine mount disposed between the power unit and the vehicle body;

a vehicle body vibration detector detecting a vibration transmitted from the power unit to the vehicle body through said active engine mount;

a passenger compartment vibration detector detecting a vibration of a member defining a passenger compartment of the vehicle;

an engine rotation speed detector detecting as to whether an engine rotation speed is smaller than a predetermined rotation speed, the frequency of the combustion basic order of an engine corresponding to a frequency which enables the bending vibration mode of the vehicle body frame to be excited when the engine is rotated in the predetermined rotation speed; and a controller controlling said active engine mount so as to reduce the vibration detected by said vehicle body vibration detector when said engine rotation speed detector detects that the engine rotation speed is not smaller than the predetermined rotation speed.

20. A vibration control apparatus as claimed in claim 19, wherein said controller controls said active engine mount so as to reduce the vibration detected by said passenger compartment vibration detector when said engine rotation speed detector detects that the engine rotation speed is smaller than the predetermined rotation speed.

21. A vibration control apparatus as claimed in claim 19, further comprising a drive force detector detecting as to whether the driving force is transmitted to driving wheels and a vehicle speed detector for detecting as to whether the vehicle speed is smaller than a predetermined speed, said controller controlling said active engine mount so as to reduce the vibration detected by said passenger compartment vibration detector when said engine rotation speed detector detects that the engine rotation speed is smaller than the predetermined rotation speed, when said drive force detector detects that the driving force is transmitted to the driving wheels and when said vehicle speed detector detects that the vehicle speed is smaller than the predetermined speed, said controller controlling said active engine mount so as to reduce the vibration detected by said vehicle body vibration detector when said engine rotation speed detector detects that the engine rotation speed is not smaller than the predetermined rotation speed, when said drive force detector detects that the driving force is not transmitted to the driving wheels or when said vehicle speed detector detects that the vehicle speed is not smaller than the predetermined speed.

* * * * *